No. 893,625.
PATENTED JULY 21, 1908.
J. HEUSCHER & E. WEBER-STIERLIN.
MEANS FOR PRODUCING CIRCULATION IN LIQUID TANKS.
APPLICATION FILED OCT. 21, 1907.
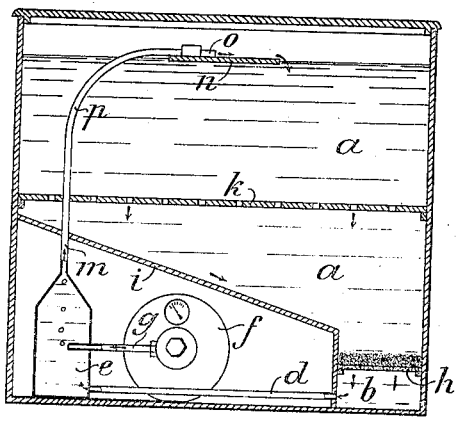

UNITED STATES PATENT OFFICE.

JEAN HEUSCHER AND ERNST WEBER-STIERLIN, OF ZURICH, SWITZERLAND.

MEANS FOR PRODUCING CIRCULATION IN LIQUID-TANKS.

No. 893,625.  Specification of Letters Patent.  Patented July 21, 1908.

Application filed October 21, 1907. Serial No. 398,488.

*To all whom it may concern:*

Be it known that we, JEAN HEUSCHER and ERNST WEBER-STIERLIN, both citizens of the Swiss Confederation, residing at Zurich, Switzerland, have invented a new and useful Improvement in Means for Producing Circulation in Liquid-Tanks, of which the following is a specification.

The annexed drawing shows a cross section of a vessel arranged to serve as our improved aquarium.

This invention relates to means for producing circulation in liquid - tanks, aquariums, reservoirs and so forth with a view to filtering the liquids therein and separating impurities therefrom.

The invention will be readily understood from the following description with reference to the accompanying drawing, which, by way of an example, shows an aquarium for carrying live-fish and other water animals.

The vessel comprises three communicating water compartments $a$ $b$ and $e$, the two former being separated by a filter $h$ and the two latter being connected together by a pipe $d$. The compartments are filled from the top and consequently the compartments $b$ and $e$ are supplied with filtered water. At the upper end of the chamber $e$ is a tubular extension $m$ to which is secured a hose $p$ whose free end is attached to a float $n$ and fitted with a nozzle $o$. The water is thus led through the tube $m$ and hose $p$ to the level of the water in the compartment $a$ where it issues from the nozzle $o$ upon the float $n$. The chamber $e$ has an air-pipe $g$ connected with a compressed air vessel $f$, so that air-bubbles under pressure will be forced with the water up the pipe and hose $p$, thereby insuring a continuous flow from the nozzle $o$ into the compartment $a$. In this manner, constant circulation takes place from the compartment $a$ through the filter $h$, compartment $b$, pipe $d$, chamber $e$, tube $m$, hose $p$ and nozzle $o$ accompanied with filtration. The compartment $a$ has a perforated false bottom $k$ which retains the fishes or other water animals while permitting the excrements to pass through the perforations towards the filter. By reason of the slanting floor $i$ of the compartment $a$ it is only necessary to provide a comparatively small filter and yet prevent settlements accumulating on said floor. The compressed air vessel $f$ can also be filled with compressed oxygen or other gases.

We claim:

1. In a liquid vessel provided with means for circulating the liquid therein, the combination with an outer receptacle, of an inner low vertical partition parallel with one of the sides of the receptacle, a slanting partition leading from said vertical partition to the opposite wall of the receptacle, a filter grating between the vertical partition and the adjacent side of the receptacle, a communication pipe in said vertical partition, a circulation vessel below below the filter, a circulation vessel below the slanting partition and connected to the end of the pipe, a flexible hose secured to the top of the circulation vessel, a floating nozzle fast to the free-end of said hose, and a compressed air chamber communicating with the circulation vessel as set forth.

2. In a circulating vessel, the combination with the outer walls of the receptacle, of an internal slanting partition from one side of such vessel to near the opposite side, a vertical partition from the lower edge of said slanting partition to the floor of the vessel, a comparatively narrow filter between said vertical partition and the adjacent outer wall, a pipe fixed in said vertical partition near the floor of the receptacle, a vertical circulation vessel connected with said pipe, a compressed air chamber communicating with the circulation vessel, a hose attached to the latter, a nozzle at the end of the hose, and a float for sustaining said nozzle at the liquid level in the receptacle, as and for the purpose set forth.

JEAN HEUSCHER.
ERNST WEBER STIERLIN.

Witnesses:
 A. LIEBERKNECHT,
 L. LEVALLEY.